(12) United States Patent
Zu et al.

(10) Patent No.: US 11,893,837 B2
(45) Date of Patent: Feb. 6, 2024

(54) METHOD OF SETTING OPERATIONAL AUTHORITY FOR ELECTRIC MOTORCYCLE

(71) Applicant: ZENTROPY CO., LTD., Seongnam-si (KR)

(72) Inventors: Seung Don Zu, Incheon (KR); Jae Sang Lee, Seoul (KR)

(73) Assignee: ZENTROPY CO., LTD., Seongnam-si (KR)

( * ) Notice: Subject to any disclaimer, the term of this patent is extended or adjusted under 35 U.S.C. 154(b) by 861 days.

(21) Appl. No.: 16/965,831

(22) PCT Filed: Jan. 25, 2019

(86) PCT No.: PCT/KR2019/001076
§ 371 (c)(1),
(2) Date: Jul. 29, 2020

(87) PCT Pub. No.: WO2019/151720
PCT Pub. Date: Aug. 8, 2019

(65) Prior Publication Data
US 2021/0049838 A1 Feb. 18, 2021

(30) Foreign Application Priority Data
Jan. 30, 2018 (KR) .......................... 10-2018-0011329

(51) Int. Cl.
G07C 5/02 (2006.01)
G07C 5/00 (2006.01)
(Continued)

(52) U.S. Cl.
CPC ................ G07C 5/02 (2013.01); B62M 6/40 (2013.01); G06Q 50/30 (2013.01); G07C 5/008 (2013.01)

(58) Field of Classification Search
CPC . G07C 5/02; G07C 5/008; G07C 9/27; B62M 6/40; G06Q 50/30; G06Q 2220/00; H04L 63/108; H04W 12/61
See application file for complete search history.

(56) References Cited

U.S. PATENT DOCUMENTS 10,277,592 B2 * 4/2019 Saka ........................ G06F 21/44
10,714,955 B2 * 7/2020 Penilla ...................... B60L 1/06
(Continued)

FOREIGN PATENT DOCUMENTS

JP 2013-149070 A 8/2013
JP 2014-164589 A 9/2014
(Continued)

Primary Examiner — Sisay Yacob
(74) Attorney, Agent, or Firm — NKL LAW; Jae Youn Kim

(57) ABSTRACT

A method of setting an operational authority for an electric motorcycle is proposed, the method including a product registration step of pre-registering mapping information of an ID of an electric motorcycle and manager information in a management server; a manager registration step of completing manager registration with the electric motorcycle using the mapping information when the management server receives the ID from the electric motorcycle; a driver registration step of performing driver registration in the electric motorcycle through pairing with the electric motorcycle, when the management server receives driver information from a driver terminal; and an operational authority registration step of completing, when the management server receives a registration request for operational authority information from a manager terminal, a registration of the operational authority information for the electric motorcycle through pairing with the electric motorcycle, by the driver terminal, using the operational authority information.

27 Claims, 3 Drawing Sheets

(51) Int. Cl.
 *B62M 6/40* (2010.01)
 *G06Q 50/30* (2012.01)

(56) References Cited

U.S. PATENT DOCUMENTS

| | | | | |
|---|---|---|---|---|
| 10,857,901 | B2* | 12/2020 | Shiiyama | G06Q 50/30 |
| 11,227,490 | B2* | 1/2022 | Dutta | G08G 1/017 |
| 2016/0173496 | A1* | 6/2016 | Saka | H04W 12/08 |
| | | | | 726/4 |
| 2018/0111494 | A1* | 4/2018 | Penilla | G06Q 20/145 |
| 2019/0389326 | A1* | 12/2019 | Shiiyama | G06Q 10/0833 |
| 2020/0402391 | A1* | 12/2020 | Dutta | G08G 1/166 |

FOREIGN PATENT DOCUMENTS

| | | |
|---|---|---|
| KR | 10-2009-0016773 A | 2/2009 |
| KR | 10-2009-0041156 A | 4/2009 |
| KR | 10-2011-0107946 A | 10/2011 |

\* cited by examiner

METHOD OF SETTING OPERATIONAL AUTHORITY FOR ELECTRIC MOTORCYCLE

TECHNICAL FIELD

The present disclosure relates to a method of setting an operational authority for an electric motorcycle and, more particularly, to a method of setting an operational authority for an electric motorcycle which is to set an operational authority for an operational time and an operational region, as well as a driver capable of operating the electric motorcycle.

BACKGROUND ART

Recently, as environmental pollution problems have emerged, interest in electric vehicles (EVs) as so-called eco-friendly vehicles has increased. Recently, technology development for an electric motorcycle (electric two-wheeled vehicle), which is convenient for movement in a narrow alley or in a short distance and is widely used for leisure activities, is also actively progressing. Like an electric vehicle (EV), the electric motorcycle obtains power to drive a motor using power of a battery.

Recently, the electric motorcycle has been widely used for commercial purposes such as delivery and consignment. Such commercial electric motorcycles are operated by a large number of drivers under the supervision of a manager.

For large number of commercial electric motorcycles, operating regulations are established in such a way that the drivers are designated in charge of each electric motorcycle and only the designated drivers are permitted to operate the electric motorcycles within the operational time and operational region range.

Although the drivers are prohibited from using the motorcycle for non-business purposes through these regulations to prevent a variety of safety accidents and theft accidents, the management is limited because there is no automated management system in the related art.

In particular, when the driver of an electric motorcycle used for the delivery industry wants to use the electric motorcycle for commuting or personal use, the manager provides the electric motorcycle owned by the business to the driver for the convenience of the driver, but there is no realistic way to manage the operation of the electric motorcycle during off-hours.

DISCLOSURE

Technical Problem

Accordingly, the present disclosure has been proposed to solve the above problems in the related art, and an objective of the present disclosure is to provide a method of setting an operational authority for an electric motorcycle by registering a driver capable of operating the electric motorcycle, an operational time, and an operational region.

In addition, another objective of the present disclosure is to provide a method of setting the operational authority of an electric motorcycle, which is to efficiently manage the use of the electric motorcycle during off-hours in such a manner that the administrator designates a driver and sets a time and region in which the designated driver is permitted to operate the electric motorcycle when the electric motorcycle is intended to be used during off-hours.

Technical Solution

A method of setting an operational authority for an electric motorcycle according to an embodiment of the present invention includes a product registration step of pre-registering mapping information of an identification number (ID) of the electric motorcycle and manager information in a management server; a manager registration step of transmitting, when the management server receives the identification number (ID) from the electric motorcycle, the manager information mapped to the ID to the electric motorcycle, and completing, when the manager terminal receives manager registration authority information from the management server, registration of a manager in the electric motorcycle through pairing with the electric motorcycle using the manager registration authority information; a driver registration step of transmitting, when the management server receives driver information from a driver terminal according to a registration request for a driver from the manager terminal, the driver information to the electric motorcycle, and performing, when the driver terminal receives driver registration authority information from the management server, registration of a driver in the electric motorcycle through pairing with the electric motorcycle using the driver registration authority information; and an operational authority registration step of transmitting, when the management server receives a registration request for operational authority information together with the driver information from the manager terminal, the operational authority information to the electric motorcycle and the driver terminal and completing registration of the operational authority information for the electric motorcycle through pairing with the electric motorcycle using the operational authority information in the driver terminal.

In addition, a method of setting an operational authority for an electric motorcycle according to another embodiment of the present invention includes (a) by an electric motorcycle, transmitting an identification number (ID) to a management server; (b) by the management server, transmitting an app installation link with the ID to a manager terminal when receiving the ID; (c) by the manager terminal, installing an app through the app installation link and registering manager information to the App; (d) by the management server, transmitting the manager information registered in the app to the electric motorcycle, and transmitting a first connection link with the electric motorcycle to the manager terminal; (e) by the manager terminal, completing registration of the manager information in the electric motorcycle by performing pairing with the electric motorcycle through the first connection link; (f) by the manager terminal, transmitting the driver information to the management server; (g) by the management server, transmitting the app link to the driver terminal using the received driver information; (h) by the driver terminal, installing the app using the received app link and registering the driver information to the app; (i) when the driver information is registered in the app, by the manager terminal, transmitting the driver information to the electric motorcycle and transmitting a second connection link with the electric motorcycle to the driver terminal; (j) by the driver terminal, completing registration of the driver information in the electric motorcycle by performing pairing with the electric motorcycle through the second connection link; (k) by the manager terminal, transmitting operational authority information for the driver to the management server; (l) by the management server, transmitting the operational authority information to the electric motorcycle; (m) by the management server, transmitting a third connection link with the electric motorcycle to the driver terminal when reception of the operational authority information is completed from the electric motorcycle; and (n) by the driver terminal, completing registration of the operational authority information in the electric motorcycle by performing pairing with the electric motorcycle through the third connection link.

Advantageous Effects

According to the present disclosure, since a driver capable of operating the electric motorcycle, an operational time, and an operational region are registered, the registered driver can use the electric motorcycle only in the operational time and the operational region, thereby making it convenient to use and manage the electric motorcycle.

In addition, according to the present disclosure, since the electric motorcycle is managed in relation to information about a designated driver, an operational time, and an operational region, immediate response is possible when an accident or problem with the electric motorcycle occurs.

In addition, according to the present disclosure, since the electric motorcycle is operated only when the electric motorcycle is paired with a driver terminal previously designated by the administrator through a short-range wireless communication, the electric motorcycle can be prevented from being provided to an undesignated number of people, thereby reducing the risk of theft.

MODE FOR INVENTION

Figure 1:
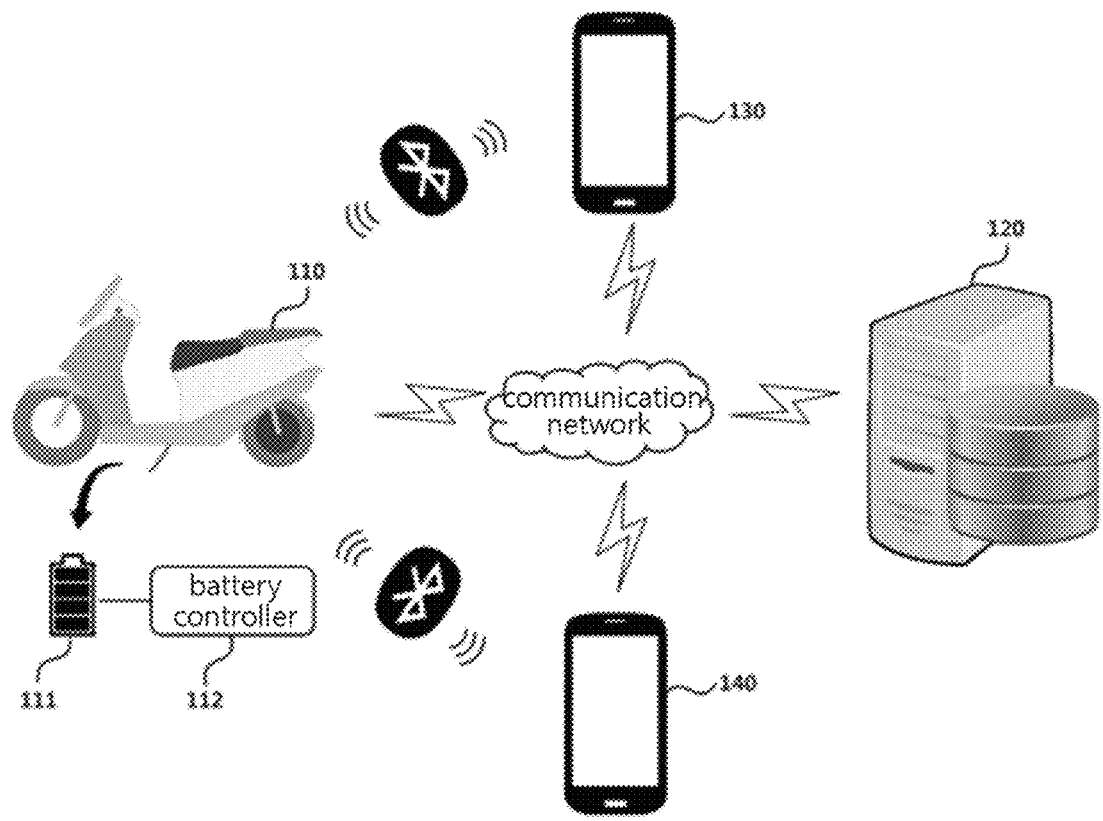
FIG. 1 is an overall configuration diagram of a network system in which an electric motorcycle communicates according to an embodiment of the present disclosure.

Hereinafter, some embodiments of the present disclosure will be described in detail with reference to exemplary drawings. It is to be noted that, in adding reference numerals to the constituent elements of the drawings, the same constituent elements are denoted by the same reference numerals whenever possible, even when they are shown in different drawings. In the following description of the embodiments of the present disclosure, when it is determined that a detailed description of known functions and configurations incorporated herein hinders understanding for the embodiments of the present disclosure, the detailed description will be omitted.

In describing the components of the embodiment of the present disclosure, terms such as first, second, A, B, (a), and (b) can be used. These terms are intended to distinguish the constituent elements from other constituent elements, and the terms do not limit the nature, order or order of the constituent elements. When a constituent element is described as being "linked", "coupled", or "connected" to another constituent element, it will be appreciated that they can be directly coupled or connected, and also they can be "linked", "coupled", or "connected" with still another constituent element in between.

FIG. 1 is an overall configuration diagram of a network system in which an electric motorcycle communicates according to an embodiment of the present disclosure. Referring to FIG. 1, an electric motorcycle 110 according to the present disclosure is a mobile device operated by driving a motor using power of a built-in battery, and has various electronic devices and components mounted therein. In addition, some electronic devices and components are equipped with various programs and software to cope with the abnormal occurrence of the electric motorcycle 110 according to the present disclosure.

A manager terminal 130 is a terminal possessed by a manager who manages the electric motorcycle 110, and a driver terminal 140 is a terminal carried by a driver driving the electric motorcycle 110, in which both are capable of wireless communication with the electric motorcycle 110. These terminals 130 and 140 include, for example, terminals such as smartphones and tablet PCs.

The manager terminal 130 and the driver terminal 140 are capable of direct wireless communication through short-range communication with the electric motorcycle 110, as well as communication through a communication network. As such short-range communication, known wireless communication methods such as Wi-Fi, NFC, ZigBee, Bluetooth, RFID, and the like may be used.

In addition, the manager terminal 130 and the driver terminal 140 may transmit necessary commands or requests from the electric motorcycle 110 and may receive necessary information from the electric motorcycle 110.

A management server 120 performs communication with each of the electric motorcycle 110, the manager terminal 130, and the driver terminal 140 to transmit and receive necessary information. For example, the manager terminal 130 registers manager information to the management server 120, and the driver terminal 140 registers driver information to the management server 120. The electric motorcycle 110 may also register related information to the management server 120.

The manager terminal 130 manages at least one electric motorcycle 110. To this end, drivers capable of driving multiple electric motorcycles 110, operational times, and operational regions are designated and registered to the management server 120.

The electric motorcycle 110 performs communication with the manager terminal 130 and the driver terminal 140 through wireless communication, and authenticates the driver terminal 140 designated by the manager terminal 130, thereby allowing an owner of the driver terminal 140 to operate the motorcycle by designating the owner as a driver.

In addition, the electric motorcycle 110 is operated by driving the motor through power supplied from the battery 111 to the motor. A battery controller 112 is provided to control the power of the battery 111. That is, the battery controller 112 controls to supply the power from the battery 111 to the motor so that only an authorized driver may be allowed to drive the electric motorcycle 110 and the driver may drive the electric motorcycle only in the operational time and operational region.

Therefore, when a designated driver is allowed to operate the motorcycle only in a designated operational time and region, the battery controller 112 supplies the power from the battery 111 to the motor to enable the driving of the motor, and when the driver operates the motorcycle outside the operational time and operational region, the power is not supplied from the battery 111 to prevent the motor from being driven, thereby managing authority for the operational times and the operational regions.

The electric motorcycles 110 are assigned identification numbers (IDs), respectively. The management server 120 separately manages each electric motorcycle 110 using these IDs.

The management server 120 is connected to the electric motorcycle 110, the manager terminal 130, and the driver terminal 140 through a communication network such as the Internet to exchange information, registers the manager terminal 130 to the electric motorcycle 110, designates the driver for each electric motorcycle 110 through the registered manager terminal 130, and performs management in such a manner that authentication is performed through connection between the designated driver terminal 140 and the electric motorcycle 110 and then the operation is allowed only within the designated time and region.

Each of the manager terminal 130 and the driver terminal 140 is paired with the electric motorcycle 110 by short-range wireless communication, and manager information and driver information are registered to the paired electric motorcycle 110, so that the manager and the driver may be authenticated.

A method of setting an operational authority for an electric motorcycle will be described in detail.

The method of setting the operational authority for the electric motorcycle according to the present disclosure includes a product registration step, a manager registration step, a driver registration step, an operational authority registration step, and an operational authority change step.

Product Registration Step

In order to purchase the electric motorcycle 110 with an identification number ID and to register a manager before releasing the electric motorcycle 110A, a management server 120 performs mapping between the ID of the electric motorcycle 110 and manager information to register and store such mapping information.

This step is to register the manager for at least one electric motorcycle 110 in the management server 120, which is to map the ID of each electric motorcycle 110 with the manager information of the corresponding manager and to save the mapping result. Accordingly, the management server 120 enables identifying who the manager is for each electric motorcycle 110.

Manager Registration Step

This step is a process for registering the manager in the electric motorcycle 110 after the electric motorcycle 110 is released. To this end, when the management server 120 receives the ID from the electric motorcycle 110, the management server 120 transmits the manager information mapped to the ID to the electric motorcycle 110, and when manager registration authority information is received from the management server 120, the manager terminal 130 registers the manager to the electric motorcycle 110 through the pairing with the electric motorcycle 110 using the manager registration authority information.

More specifically, the electric motorcycle 110 transmits its own ID to the management server 120. The management server 120 checks manager information corresponding to the received ID from the pre-stored mapping information and then transmits app link information to the manager terminal 130. After the manager terminal 130 installs the app using the app link information and then executes the app, thereby registering the manager information. The management server transmits manager information registered in the app to the electric motorcycle 110. When the reception completion of the manager information is notified from the electric motorcycle 110, the management server 120 transmits the manager registration authority information to the manager terminal 130. The manager terminal 130 performs pairing with the electric motorcycle 110 using the manager registration authority information. The registration of the manager information in the electric motorcycle 110 is completed through such pairing.

Driver Registration Step

This is a process for registering a driver capable of driving the electric motorcycle 110 to the electric motorcycle 110. To this end, when the management server 120 receives driver information from the driver terminal 130 according to a request for driver registration from the manager terminal 130, the management server 120 transmits the driver information to the electric motorcycle 110, and when the driver terminal 130 receives driver registration authority information from the management server 120, the driver terminal 130 registers the driver to the electric motorcycle 110 through pairing with the electric motorcycle 110 using the driver registration authority information.

More specifically, the manager terminal 130 transmits the driver information to be registered to the management server 120. The management server 120 transmits app link information to the driver terminal 140 corresponding to the driver information. The driver terminal 140 installs the app and then registers the driver information to the app. The management server 120 transmits the driver information registered in the app to the electric motorcycle 110. When the reception completion of driver information is notified from the electric motorcycle 110, the management server 120 transmits the driver registration authority information to the manager terminal 140. The manager terminal 130 performs pairing with the electric motorcycle 110 using the driver registration authority information. The registration of the driver information in the electric motorcycle 110 is completed through such pairing.

Operational Authority Registration Step

This step is a process for registering the time and region in which the driver registered in the electric motorcycle 110 is permitted to operate. The operational authority means an authority to permit the registered driver to operate in the operational time and operational region, and the operational authority information includes the driver information, the operational time, and the operational region. To this end, when the management server 120 receives a registration request for the operational authority information together with the driver information from the manager terminal 130, the management server 120 transmits the operational authority information to the electric motorcycle 110 and the driver terminal 140, and the driver terminal 140 completes the registration of operational authority information for the electric motorcycle 110 through pairing with the electric motorcycle 110 using the operational authority information.

More specifically, the manager terminal 130 transmits a change request for operational authority information to the management server 120. The management server 120 transmits the operational authority information, for which the change is requested, to the electric motorcycle 110. The management server 120 transmits a confirmation request for the operational authority information, for which the change is requested, to the driver terminal 140. The driver terminal 140 performs pairing with the electric motorcycle 110 according to the confirmation request. The registration of the operational authority information, for which the change is requested, in the electric motorcycle 110 is completed through such pairing.

Thus, the electric motorcycle 110 performs authentication on the driver according to the registered operational authority information to permit the driver to operate the motorcycle only in the operational time and operational region.

Operational Authority Change Step

This step is a process for changing the operational authority information registered in the electric motorcycle 110. To this end, the manager terminal 130 transmits a change request for the operational authority information to the management server 120. The management server 120 transmits the operational authority information, for which the change is requested, to the electric motorcycle 110. Thereafter, the management server 120 transmits a confirmation request for the operational authority information, for which the change is requested, to the driver terminal 140. The driver terminal 140 performs pairing with the electric motorcycle 110 according to this confirmation request. The registration of the operational authority information, for which the change is requested, in the electric motorcycle 110 is completed through such pairing.

Accordingly, the electric motorcycle 110 performs authentication on the driver according to the changed operational authority information to permit the driver to operate the motorcycle only in the operational time and the operational region.

In each of the steps described above, the manager information includes a name of the manager, and an identification number or a phone number of the manager terminal 130, and the driver information includes a name of the driver, and an identification number or a telephone number of the driver terminal 140.

In addition, the operational authority information includes a name of the driver, the telephone number of the driver terminal 140, and the operational time and driving region of the driver.

In addition, the electric motorcycle 110 includes a timer (not shown) for detecting the current time. When the detected current time is within the operational time of the driver included in the operational authority information registered as above, the battery controller 112 performs control so that the power of the battery 111 is supplied to the motor.

That is, the battery controller 112 performs control so that when the current time is within the range of the registered operational time, the power of the battery 111 is supplied to the motor, and when the current time is outside the range of the operational time, the power of the battery 111 is not supplied to the motor. This is to permit the registered driver to operate the electric motorcycle only within the registered operational time.

In addition, the electric motorcycle 110 includes a position detecting unit (not shown) for detecting the current position. When the currently detected location information is within the operational region included in the operational authority information registered as above, the battery controller 112 performs control so that the power of the battery 111 is supplied to the motor.

That is, the control is performed so that when the current location is within the range of the registered operational region, the power of the battery 111 is supplied to the motor, and when the current location is not in the range of the operational region, the power of the battery 111 is not supplied to the motor. This is to permit the registered driver to operate the electric motorcycle only within the registered operational time.

When the current time is outside the operational time or the current position is outside the operational region, the electric motorcycle 110 may output a warning alarm itself and transmit the warning alarm to the driver terminal 140.

Figure 2:
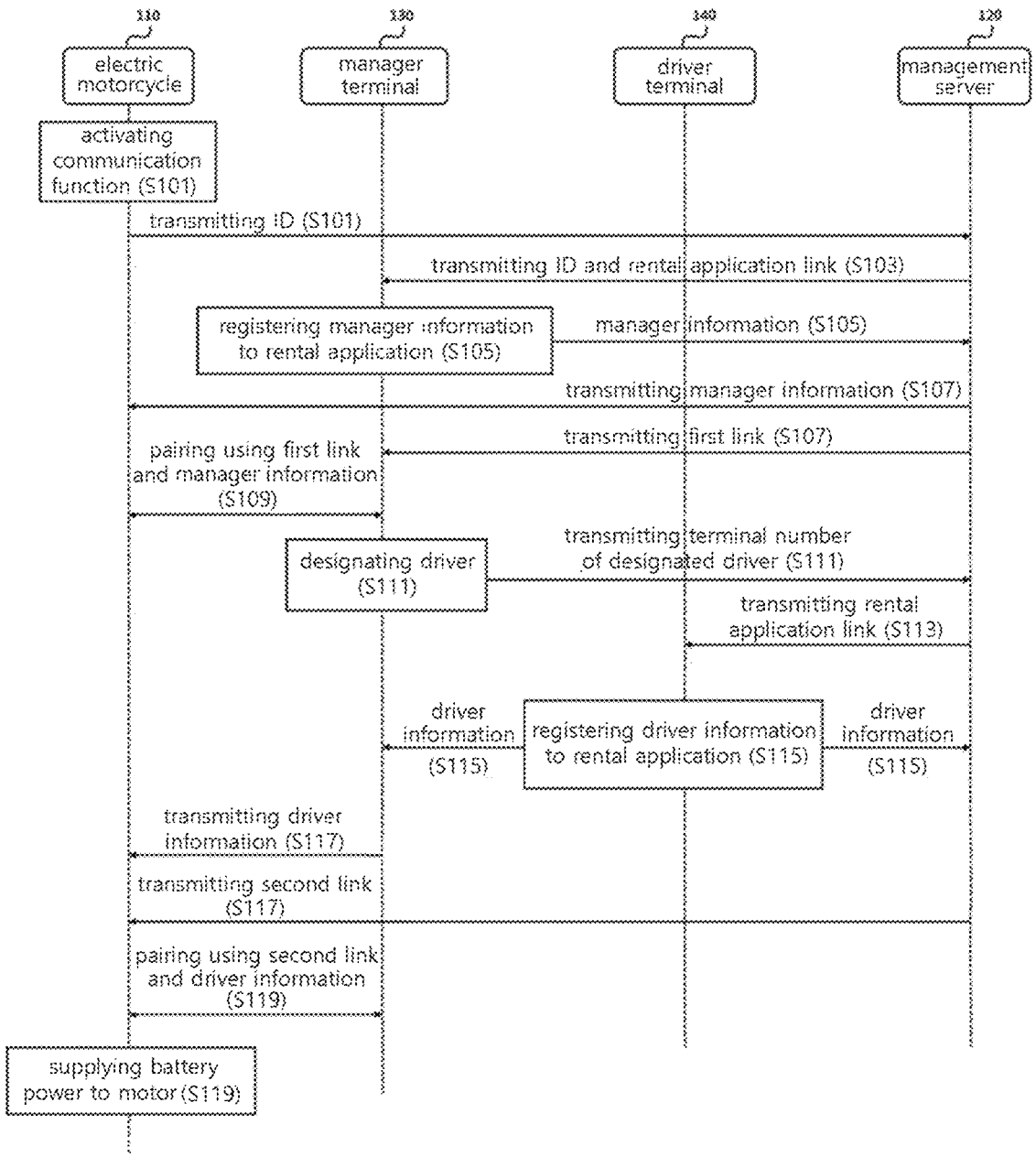
FIG. 2 is a flow chart showing a method of setting an operational authority for an electric motorcycle according to an embodiment of the present disclosure.

Referring to FIGS. 2 and 3, the operational authority setting method of the electric motorcycle according to the present disclosure will be described in more detail.

FIG. 2 is a flow chart showing a method of setting an operational authority for an electric motorcycle according to an embodiment of the present disclosure. Referring to FIG. 2, the method of setting an operational authority of an electric motorcycle according to the present disclosure starts from a step in which the electric motorcycle 110 activates a communication function to register an identification number ID.

The electric motorcycle 110 is assigned an identification number ID, such as a product number. In order to manage multiple electric motorcycles 110, it is necessary to collect IDs for each electric motorcycle 110 and manage the IDs separately for each electric motorcycle 110.

Therefore, the electric motorcycle 110 activates the communication function to connect to the management server 120 and then transmits its own ID to the management server 120 (S101).

When the management server 120 collects the ID of each electric motorcycle 110, the management server 120 transmits a preset application installation link together with the collected ID to the manager terminal 130 (S103).

Such an app is provided to perform the authentication on the manager and the driver and set the operational authority, so that the manager terminal 130 and the driver terminal 140 set the operational authority of each electric motorcycle 110 using the management server 120 to permit the designated driver to drive the motorcycle in the designated time and region. Herein, the app is installed in each of the manager terminal 130 and the driver terminal 140 and transmits the input information to the management server 120.

The manager terminal 130 and the driver terminal 140 proceed to download and install the app through an app install link for the first time in order to manage the electric motorcycle 110.

When the manager terminal 130 has completed the installation of the App, the app is executed so that the manager information is input to allow the manager to be registered (S105). The manager information includes a name of the manager and an identification number or a telephone number of the manager terminal 130.

The identification number of the manager terminal 130 may be an identification number required for communication connection, when performing pairing between the manager terminal 130 and the electric motorcycle 110 which is to be performed later. For example, it may be a unique number or unique name of the manager terminal 130.

When the manager information is registered in the App, the management server 120 transmits the registered manager information to the electric motorcycle 110, and transmits the first access link to the manager terminal 130, which is a link for communication connection to cause the electric motorcycle 110 to be paired with the manager terminal 130 through short-range communication (S107).

The manager terminal 130 receives the identification number and the first access link and performs pairing with the electric motorcycle 110 (S109). Herein, the first access link is preferably a request link for communication connection, such as a pairing request link, through a short-range wireless communication, such as Bluetooth.

When the manager terminal 130 makes a request for pairing with the electric motorcycle 110 via the first connection link, the electric motorcycle 110 uses the identification number of the manager terminal 130 included in the manager information received from the management server 120 to check whether the manager terminal 130 is the same as the predetermined manager terminal 130, and then accepts the pairing to recognized the manager terminal 130 as a manager, in step S105.

Herein, the manager terminal 130 receives the identification number from the electric motorcycle 110, which has undergone pairing through the first connection link among the multiple electric motorcycles 110, and compares the same with the identification number transmitted from the management server 120 to store information on pairing with the electric motorcycle corresponding to the matching identification number in step S103.

For example, the manager terminal 130 receives a total of 11, identification numbers bike1 to bike11, from the management server 120 and receives an identification number bike6 from the electric motorcycle 110 which has undergone pairing through the first access link, the manager terminal 130 stores the electric motorcycle 110 as an identification number called bike6.

This identification number is for easy classification and management, when pairing multiple electric motorcycles 110 with one manager terminal 130.

When the manager terminal 130 is paired with the electric motorcycle 110 to be registered as the manager, the manager terminal 130 designates a driver capable of operating the electric motorcycle 110.

The manager terminal 130 registers the driver terminal 140 of the driver assigned to the electric motorcycle 110 to the management server 120, and transmits the number of the driver terminal 140 to the management server 120 to connect to the electric motorcycle 110 (S111).

Then, the management server 120 is to transmit the app link to the number of the driver terminal 140 to register the driver terminal 140 to the management server 120 (S113). The driver terminal 140 downloads and installs the app through the received app link, and executes the app to input driver information (S115). Herein, the driver information includes a name of the driver and the identification number or a telephone number of the driver terminal 140.

When driver information is registered in the App, the manager terminal 130 transmits the driver information to the electric motorcycle 110 by selecting a driver designated for the electric motorcycle 110 from among drivers registered in the App, and the management server 120 transmits a second connection link for communication connection to the electric motorcycle 110 to the driver terminal 140 (S117).

The driver terminal 140 is connected to the second connection link to make a request for pairing to the electric motorcycle 110, to confirm that the electric motorcycle 110 has the same identification number as the driver terminal 140 making a request for pairing, by using the identification number of the driver terminal 140 included in the driver information received in step S117, and to accept the pairing, thereby completing the communication connection with the driver terminal 140 (S119).

Through these steps, the electric motorcycle 110 is connected to the driver terminal 140 designated by the manager terminal 130 through short-range wireless communication to complete the pairing. The motor is controlled to be operated depending on the operational time and operational region range set through the paired driver terminal 140 or manager terminal 130. That is, the battery controller 112 allows the power of the battery 111 to be supplied to the motor within the operational time and operational region, thereby causing the electric motorcycle 110 to be operated. Conversely, the battery controller 112 allows the power of the battery 111 not to be supplied to the motor outside the operational time and the operational region, thereby preventing the electric motorcycle 110 from being operated.

Figure 3A:
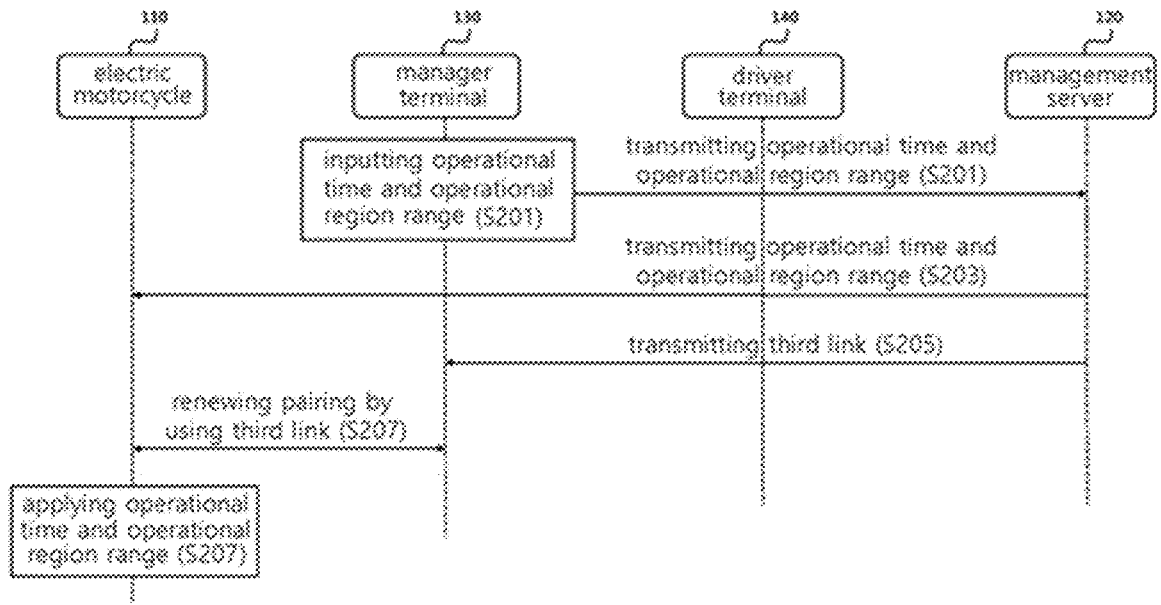
FIGS. 3A-3B are flow chart showing a method of setting an operational authority of an electric motorcycle according to another embodiment of the present disclosure.
Figure 3B:
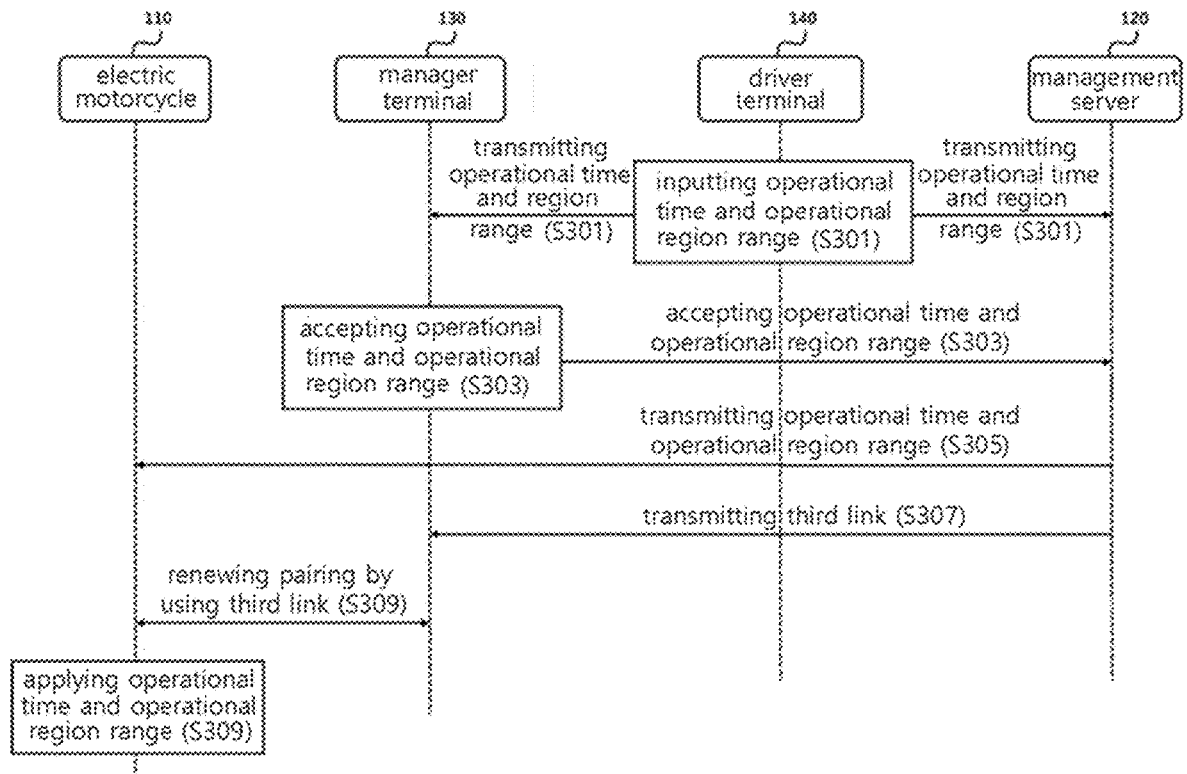

FIGS. 3A-3B are flow chart showing a method of setting the operational authority of the electric motorcycle according to another embodiment of the present disclosure. In FIGS. 3A-3B, a process of registering operational authority information for the operational time and operational region of the electric motorcycle 110 is shown.

First, a view in FIG. 3A is a flowchart of a method of setting the operational authority of the electric motorcycle 110 using the manager terminal 130. When pairing between the driver terminal 140 and the electric motorcycle 110 is completed, the manager terminal 130 enters and sets the operational time and operational region of the electric motorcycle 110 through the app (S201).

Then, the management server 120 transmits the operational time and operational region set in the app to the electric motorcycle 110 (S203), and transmits the third connection link to the driver terminal 140 so that the driver terminal 140 renews the pairing with the electric motorcycle 110 (S205).

The driver terminal 140 is connected to the third connection link and thus makes a request for pairing to the electric motorcycle 110 to perform authentication on the operational time and operational region set newly. When the pairing request is accepted, the electric motorcycle 110 controls the battery controller 112 according to the set range of the operational time and operational region, thereby controlling the power of the battery 111 to the motor (S207).

A view of FIG. 3B is a flow chart showing a method of setting the driving authority of the electric motorcycle 110 using a driver terminal 130. After completing pairing between the driver terminal 140 and the electric motorcycle 110 is completed, when the driver terminal 140 receives the operational time and operational region of the electric motorcycle 110 through the app (S301), the manager terminal 130 performs the acceptance of the input operational time and operational region range (S303).

That is, even though the driver terminal 140 may set the operational time and operational region of the electric motorcycle 110, the set result should be accepted through the manager terminal 130, whereby the manager may perform management of the operational authority of the electric motorcycle 110.

When the manager terminal 130 completes the acceptance of the operational time and operational region range, subsequent steps are performed in steps S305 to S309 as in steps S203 to S207 in the view of FIG. 3A.

When modifying the predetermined operating authority, the method of setting the operational authority for the electric motorcycle 110 described above referring to FIGS. 3A-3B may be also applied.

That is, when modifying the range of the predetermined operational time and operational region or changing the driver, both the manager terminal 130 and driver terminal 140 may modify the same. In order to finally apply the modified contents, a method of renewing the pairing of the driver terminal 140 and the electric motorcycle 110 is applied.

When the range of the operational time and operational region is set by the electric motorcycle 110, the electric motorcycle 110 is operated so that the motor is driven according to the set range of the operational time and operational region. The electric motorcycle 110 controls the battery controller 112 to supply the power of the battery 111 to the motor when the electric motorcycle 110 is in the operational time in a state of performing the pairing with the driver terminal 140 designated by the manager terminal 130, whereby the driver designated by the manager terminal 130 may operate the motorcycle only within the set range of the operational time and operational region.

When the driver operates the electric motorcycle 110 outside the operational time or operational region, the battery controller 112 interrupts the power of the battery 111 to the motor to prevent the electric motorcycle 110 from being operated.

However, when the power supply of the battery 111 to the motor of the electric motorcycle 110 is suddenly interrupted, the electric motorcycle 110 stops suddenly on the road, which results in an accident.

Therefore, the electric motorcycle 110 generates a warning notification itself or transmits a warning alarm to the driver terminal 130, to allow the driver to know the end of operational time, so that the driver may return the electric motorcycle 110 within the operational time.

In addition, the electric motorcycle 110 is equipped with a location calculator (not shown) that detects and calculates its current location, such as a GPS receiver, to calculate the current location and continuously compare the calculated current location with the range of the operational region. Therefore, the electric motorcycle 110 generates a warning alarm itself or transmits a warning alarm to the driver terminal 140 at the boundary point a immediately before leaving the operational region, to allow the driver not to go outside the operational range.

When the driver needs to continue operating outside the operational region, the driver may make a change request for operating authority of the electric motorcycle 110 to set the operational range wider as shown in the view FIGS. 3A-3B.

Through such management of the operational time and region of the electric motorcycle, the manager can effectively manage to allow multiple electric motorcycles not to be used during off-hours, thereby preventing the risk of theft and responding immediately to any problem.

In addition, although the present disclosure describes an embodiment of setting the operational authority for an electric motorcycle, the present disclosure is not limited thereto and can be applied to devices such as battery chargers of electric motorcycles. That is, a buyer who purchases a battery charger may register himself as the manager as described above and register a user to use the battery charger as a driver. Herein, the operational time and operational range of the user (driver) are applied as described above. Therefore, the electric motorcycle described in the present disclosure is used to mean a concept including various devices required to use an electric motorcycle for convenience of description, in which the authority to use these devices can be set in the same way as the operation authority to use the electric motorcycle.

While the present disclosure has been described in connection with what is presently considered to be the most practical and preferred embodiment, it is to be understood that the invention is not limited to the disclosed embodiments. That is, within the scope of the present disclosure, one or more of all of the elements may be selectively coupled to each other. It is to be understood that the terms "include", "comprise", or "have", as used herein, mean that a component can be implied unless specifically stated to the contrary, but should be construed as including other elements. All terms including technical or scientific terms have the same meaning as commonly understood by one of ordinary skill in the art to which this invention belongs, unless otherwise defined. Terms commonly used, such as predefined terms, should be interpreted to be consistent with the contextual meanings of the related art, and are not to be construed as ideal or overly formal, unless expressly defined to the contrary.

While the present disclosure has been described in connection with what is presently considered to be practical exemplary embodiments, it is to be understood that the invention is not limited to the disclosed embodiments. On the contrary, is intended to cover various modifications and equivalent arrangements included within the spirit and scope of the appended claims. Therefore, the embodiments disclosed in the present disclosure are not intended to limit the scope of the present disclosure but to limit the scope of the technical idea of the present disclosure. The scope of protection of the present disclosure should be construed according to the following claims, and all technical ideas within the scope of equivalents thereof should be construed as being included in the scope of the present disclosure.

The invention claimed is:

1. A method of setting an operational authority for an electric motorcycle, the method comprising:
    a product registration step of pre-registering mapping information of an identification number (ID) of the electric motorcycle and manager information in a management server;
    a manager registration step of transmitting, when the management server receives the identification number (ID) from the electric motorcycle, the manager information mapped to the ID to the electric motorcycle, and completing, when a manager terminal receives manager registration authority information from the management server, registration of a manager in the electric motorcycle through pairing with the electric motorcycle using the manager registration authority information;
    a driver registration step of transmitting, when the management server receives driver information from a driver terminal according to a registration request for a driver from the manager terminal, the driver information to the electric motorcycle, and performing, when the driver terminal receives driver registration authority information from the management server, registration of the driver in the electric motorcycle through pairing with the electric motorcycle using the driver registration authority information; and
    an operational authority registration step of transmitting, when the management server receives a registration request for operational authority information together with the driver information from the manager terminal, the operational authority information to the electric motorcycle and the driver terminal and completing registration of the operational authority information for the electric motorcycle through pairing with the electric motorcycle using the operational authority information in the driver terminal.

2. The method of claim 1, wherein the manager registration step includes:
    by the electric motorcycle, transmitting an identification number (ID) thereof to a management server;
    by the management server, checking manager information corresponding to the received ID from the mapping information and transmitting application (app) link information to the manager terminal;
    by the manager terminal, installing an application (app) and registering the manager information in the app;
    by the management server, transmitting the manager information registered in the app to the electric motorcycle;

by the management server, transmitting the manager registration authority information to the manager terminal;

by the manager terminal, performing pairing with the electric motorcycle using the manager registration authority information; and by the electric motorcycle, completing registration of the manager information through the pairing.

3. The method of claim 2, wherein after transmitting the manager information registered in the app to the electric motorcycle, the management server transmits the manager registration authority information to the manager terminal when reception completion of the manager information is notified from the electric motorcycle.

4. The method of claim 1, wherein the driver registration step includes:
by the manager terminal, transmitting driver information to be registered to the management server;
by the management server, transmitting application (app) link information to a driver terminal corresponding to the received driver information;
by the driver terminal, installing an app and registering the driver information in the app;
by the management server, transmitting the driver information registered in the app to the electric motorcycle;
by the management server, transmitting driver registration authority information to the manager terminal;
by the manager terminal, performing pairing with an electric motorcycle using the driver registration authority information; and
by the electric motorcycle, completing registration of the driver information through the pairing.

5. The method of claim 4, wherein after transmitting the driver information registered in the app to the electric motorcycle, the management server transmits the driver registration authority information to the manager terminal, when reception completion of the driver information is notified from the electric motorcycle.

6. The method of claim 1, wherein the driver registration step includes:
by the manager terminal, transmitting the operational authority information together with the driver information to the management server;
by the management server, transmitting the operational authority information to the electric motorcycle;
by the management server, transmitting a registration confirmation request for the operational authority information to the driver terminal;
by the driver terminal, performing pairing with the electric motorcycle according to the registration confirmation request of the operational authority information; and
by the electric motorcycle, completing the registration of the operational authority information through the pairing.

7. The method of claim 6, wherein the management server transmits the registration confirmation request for the operational authority information to the driver terminal, when the reception completion of the operational authority information is notified from the electric motorcycle.

8. The method of claim 1, wherein the manager information includes a name of the manager, and an identification number and a telephone number of the manager terminal.

9. The method of claim 1, wherein the driver information includes a name of the driver, and an identification number and a telephone number of the driver terminal.

10. The method of claim 1, further comprising, after the operational authority registration step:
by the manager terminal, transmitting a change request for the operational authority information to the management server;
by the management server, transmitting the operational authority information, for which the change is requested, to the electric motorcycle;
by the management server, transmitting a confirmation request for the operational authority information, for which the change is requested, to the driver terminal;
by the driver terminal, performing pairing with the electric motorcycle according to the confirmation request; and
by the electric motorcycle, completing the registration of the operational authority information, for which the change is requested, through the pairing.

11. The method of claim 10, wherein the operational authority information includes a name of the driver, a phone number of the driver terminal, an operational time and operational region of the driver.

12. The method of claim 1, further comprising, after the operational authority registration step:
by the driver terminal, transmitting a change request for the operational authority information to the manager terminal;
by the manager terminal, transmitting the change request for the operational authority information to the management server according to the change request;
by the management server, transmitting the operational authority information, for which the change is requested, to the electric motorcycle;
by the management server, transmitting a confirmation request for the operational authority information, for which the change is requested, to the driver terminal;
by the driver terminal, performing pairing with the electric motorcycle according to the confirmation request; and
by the electric motorcycle, completing the registration of the operational authority information, for which the change is requested, through the pairing.

13. The method of claim 12, wherein the operational authority information for which the change is requested includes a name of the driver for which the change is requested, a telephone number of the driver terminal for which the change is requested, and an operational time and operational region of the driver for which the change is requested.

14. The method of claim 11, wherein the electric motorcycle detects a current time and performs control such that a battery controller supplies power of a battery to a motor when the detected current time is within the driver's operational time included in the registered operational authority information.

15. The method of claim 14, wherein the electric motorcycle transmits a warning alarm to the driver terminal when the current time is outside a range of the operational time.

16. The method of claim 11, wherein the electric motorcycle detects a current position and perform control so that a battery controller supplies power of a battery to a motor when the detected current position is within the driver's driving region included in the registered operational authority information.

17. The method of claim 16, wherein the electric motorcycle transmits a warning alarm to the driver terminal when the current position is outside the operational region.

18. A method of setting an operational authority for an electric motorcycle, the method comprising:
- (a) by an electric motorcycle, transmitting an identification number (ID) to a management server;
- (b) by the management server, transmitting an application (app) installation link with the ID to a manager terminal when receiving the ID;
- (c) by the manager terminal, installing an application (app) through the app installation link and registering manager information to the app;
- (d) by the management server, transmitting the manager information registered in the app to the electric motorcycle, and transmitting a first connection link with the electric motorcycle to the manager terminal;
- (e) by the manager terminal, completing registration of the manager information in the electric motorcycle by performing pairing with the electric motorcycle through the first connection link;
- (f) by the manager terminal, transmitting a driver information to the management server;
- (g) by the management server, transmitting the app link to a driver terminal using the received driver information;
- (h) by the driver terminal, installing the app using the received app link and registering the driver information to the app;
- (i) when the driver information is registered in the app, by the manager terminal, transmitting the driver information to the electric motorcycle and transmitting a second connection link with the electric motorcycle to the driver terminal;
- (j) by the driver terminal, completing registration of the driver information in the electric motorcycle by performing pairing with the electric motorcycle through the second connection link;
- (k) by the manager terminal, transmitting operational authority information for the driver to the management server;
- (l) by the management server, transmitting the operational authority information to the electric motorcycle;
- (m) by the management server, transmitting a third connection link with the electric motorcycle to the driver terminal when reception of the operational authority information is completed from the electric motorcycle; and
- (n) by the driver terminal, completing registration of the operational authority information in the electric motorcycle by performing pairing with the electric motorcycle through the third connection link.

19. The method of claim 18, wherein the manager information includes a name of the manager, and an identification number and a phone number of the manager terminal.

20. The method of claim 18, wherein the driver information includes a name of the driver, and an identification number and a phone number of the driver terminal.

21. The method of claim 18, further comprising, after the step (n):
- by the manager terminal, transmitting a change request for the operational authority information to the management server;
- by the management server, transmitting the operational authority information, for which the change is requested, to the electric motorcycle;
- by the management server, transmitting a confirmation request for the operational authority information, for which the change is requested, to the driver terminal;
- by the driver terminal, performing pairing with the electric motorcycle according to the confirmation request; and
- by the electric motorcycle, completing registration of the operational authority information, for which the change is requested, through the pairing.

22. The method of claim 18, further comprising, after the step (n):
- by the driver terminal, transmitting a change request for the operational authority information to the manager terminal;
- by the manager terminal, transmitting the change request for the operational authority information to the management server according to the change request;
- by the management server, transmitting the operational authority information, for which the change is requested, to the electric motorcycle;
- by the management server, transmitting a confirmation request for the operational authority information, for which the change is requested, to the driver terminal;
- by the driver terminal, performing pairing with the electric motorcycle according to the confirmation request; and
- by the electric motorcycle, completing the registration of the operational authority information, for which the change is requested, through the pairing.

23. The method of claim 18, wherein the operational authority information includes a name of the driver, a phone number of the driver terminal, and an operational time and operation region of the driver.

24. The method of claim 23, wherein the electric motorcycle detects a current time and performs control such that a battery controller supplies power of a battery to a motor when the detected current time is within the driver's operational time included in the registered operational authority information.

25. The method of claim 24, wherein the electric motorcycle transmits a warning alarm to the driver terminal when the current time is outside a range of the operational time.

26. The method of claim 23, wherein the electric motorcycle detects a current position and perform control so that a battery controller supplies power of a battery to a motor when the detected current position is within the driver's driving region included in the registered operational authority information.

27. The method of claim 26, wherein the electric motorcycle transmits a warning alarm to the driver terminal when the current position is outside the operational region.

* * * * *